US006796703B2

(12) United States Patent
Lemke

(10) Patent No.: US 6,796,703 B2
(45) Date of Patent: Sep. 28, 2004

(54) CONDUCTIVITY FEEDBACK CONTROL SYSTEM FOR SLURRY BENDING

(75) Inventor: Travis A. Lemke, Eden Prairie, MN (US)

(73) Assignee: The BOC Group, Inc., Murray Hill, NJ (US)

( * ) Notice: Subject to any disclaimer, the term of this patent is extended or adjusted under 35 U.S.C. 154(b) by 0 days.

(21) Appl. No.: 09/876,459

(22) Filed: Jun. 7, 2001

(65) Prior Publication Data

US 2002/0034122 A1 Mar. 21, 2002

Related U.S. Application Data

(62) Division of application No. 09/070,226, filed on Apr. 30, 1998, now abandoned.

(51) Int. Cl.⁷ .............................................. B01F 15/02
(52) U.S. Cl. ................................................... 366/154.4
(58) Field of Search .............................. 366/136, 151.1, 366/152.1, 152.4, 159.1, 160.1, 182.1, 137, 152.2; 137/5

(56) References Cited

U.S. PATENT DOCUMENTS

| | | | |
|---|---|---|---|
| 3,392,493 A | | 7/1968 | Hoffmann et al. |
| 3,412,325 A | | 11/1968 | Soderling |
| 3,699,992 A | * | 10/1972 | Knechtel et al. ................ 137/5 |
| 3,710,811 A | * | 1/1973 | Leverenz et al. ............... 137/5 |
| 3,719,090 A | | 3/1973 | Hathaway |
| 3,877,682 A | * | 4/1975 | Moss ...................... 366/152.3 |
| 4,382,173 A | | 5/1983 | Howard-Leicester |
| 4,776,977 A | * | 10/1988 | Taylor ......................... 137/13 |
| 4,784,495 A | * | 11/1988 | Jonsson et al. ........... 366/152.4 |
| 4,823,987 A | * | 4/1989 | Switall ......................... 222/63 |
| 4,910,155 A | | 3/1990 | Cote et al. |
| 4,976,546 A | * | 12/1990 | Beattie ....................... 222/135 |
| 4,977,929 A | | 12/1990 | Chinnock et al. |
| 5,272,027 A | | 12/1993 | Dillenbeck et al. ............ 430/30 |
| 5,293,893 A | | 3/1994 | O'Dougherty ............... 137/113 |
| 5,318,750 A | * | 6/1994 | Lascombes ............... 366/152.1 |
| 5,340,370 A | | 8/1994 | Cadien et al. |
| 5,364,510 A | | 11/1994 | Carpio ..................... 204/153.1 |
| 5,447,056 A | | 9/1995 | Foote ......................... 73/61.71 |
| 5,490,611 A | | 2/1996 | Bernosky et al. ............... 222/1 |
| 5,511,875 A | * | 4/1996 | Jonsson et al. ............. 366/136 |
| 5,522,660 A | | 6/1996 | O'Dougherty et al. ...... 366/136 |
| 5,632,960 A | | 5/1997 | Ferri, Jr. et al. ............ 422/106 |
| 5,647,391 A | * | 7/1997 | Chan et al. ............... 366/152.4 |
| 5,647,989 A | | 7/1997 | Hayashi et al. ............. 210/641 |
| 5,664,990 A | | 9/1997 | Adams et al. |
| 5,755,614 A | | 5/1998 | Adams et al. |
| 5,800,056 A | * | 9/1998 | Suzuki et al. ............. 366/152.4 |
| 5,874,049 A | * | 2/1999 | Ferri et al. ................ 366/152.2 |
| 6,149,294 A | * | 11/2000 | Jonsson et al. ............. 366/136 |

FOREIGN PATENT DOCUMENTS

| | | |
|---|---|---|
| EP | 0 605 395 | 7/1994 |
| EP | 0 714 054 | 5/1996 |
| JP | 62-11520 | 7/1985 |

OTHER PUBLICATIONS

Philipossian, et al., "An Overview of Current Issues and Future Trends in CMP Consumables," Proceedings of the First CMP–MIC Conference, Feb. 1996, pp. 13–19.

J. P. Bare, "Improved Analytical Technique for Metal CMPO Slurry," Proceedigns of 2nd CMP–MIC Conference, Feb. 1997, pp. 405–408.

Adams, et al., *CMP Slurry Reprocessing*, 6 pp.

* cited by examiner

*Primary Examiner*—Tony G. Soohoo
(74) *Attorney, Agent, or Firm*—David A. Hey

(57) ABSTRACT

The invention provides a process and system that utilizes conductivity measurements during mixing of chemical components to provide a slurry having a solids content within a qualification range. That is, by providing a reference conductivity value indicative of when a sufficient amount of at least two chemicals are combined and by monitoring conductivity while the chemicals are combined, the process and system of the present invention are able to provide a slurry having a solids content within a qualification range.

9 Claims, 10 Drawing Sheets

CONDUCTIVITY FEEDBACK CONTROL SYSTEM FOR SLURRY BENDING

REFERENCE TO RELATED APPLICATION

This application is a divisional of application Ser. No. 09/070,226 filed on Apr. 30, 1998 now abandoned, and which is hereby incorporated by reference in its entirety.

FIELD OF THE INVENTION

This invention relates to a process and system for making a slurry having a solids content within a qualification range. More particularly, the invention relates to a process and system that utilize a reference conductivity value indicative of when a sufficient amount of at least two chemicals are combined to provide a slurry with the desired solids content. By monitoring conductivity while the chemicals are combined and comparing the monitored conductivity value to the reference conductivity value, the process and system of the present invention are able to easily and accurately monitor and/or provide a slurry having a solids content within a desired qualification range.

BACKGROUND OF THE INVENTION

Chemical mechanical polishing (CMP) has become an essential process in the production of integrated circuits. CMP is the process of planarizing a surface, typically a wafer surface, such that it becomes smoothed and flattened. Generally, the CMP process utilizes a chemical slurry in combination with a polishing pad to achieve the desired surface finish. Typically, chemical slurries useful in CMP comprise a solvent and plurality of solid, abrasive particles insoluble in the solvent. In the CMP process, the slurry is applied to the surface to be planarized and moved about the surface due to the motion of the polishing pad. In this manner, the particles in the slurry abrasively planarize the surface in a manner similar to sanding. Desirably, the CMP process is carried out at a known polishing rate to get planarized surfaces of desired thicknesses.

Inasmuch as the quality of the CMP process is determinative of the quality of the planarized surface produced thereby, variability in the CMP process is undesirable. Variability in the CMP process can be introduced as a result of variability in the quality of the CMP slurry. Thus, maintaining consistent slurry quality is crucial to maintaining of the consistency of the CMP process and thus, to maintaining consistent manufacturing output. Philipossian, et al., "An Overview of current Issues and future Trends in CMP Consumables," *Proceedings of the First CMP-MIC Conference*, February 1996, pp. 13–19. To this end, slurry quality is desirably monitored to decrease the possibility that slurry is a major contributor to CMP variability.

More specifically, a slurry to be used in a CMP process should have a tightly controlled solids content, i.e., weight concentration of solid particles, as even slight variations in solids content can cause dramatic variation in the rate and quality of polishing. It is further desirable that the slurry be stable, i.e., the slurry should maintain consistent polishing performance, while also resisting the tendency of the particles to settle out or agglomerate. It is additionally desirable that a chemical slurry used in a CMP process should be relatively free of contaminants, foreign particles, carbon dioxide, ionic contaminants and the like.

A variety of different instruments and/or methodologies have been proposed for monitoring slurry quality. For example, off-line measurements, such as density or specific gravity measurements, measurement of percent nonvolatile solids, or component assays, have been proposed as useful indicators of slurry quality. However, for a variety of reasons, none of these measurements are optimal indicators of slurry quality. Specifically, measurement of percent nonvolatile solids, which involves an evaporation to dryness and subsequent measure of the remaining weight of solids, requires application of high temperatures in order to provide the desired efficiency and repeatable results. However, many slurries contain dissolved solids that decompose at the high temperatures required by this procedure. For example, many tungsten slurries contain dissolved solids with low decomposition temperatures that completely decompose at the required high temperatures. As a result, this methodology often produces erroneously low values for percent nonvolatile solids in these slurries. J. P. Bare, "Improved Analytical Technique for Metal CMP Slurry," *Proceedings of 2nd CMP-MIC Conference*, February 1997, pp. 405–408.

Additionally, component assays, i.e., assays that measure the concentration of dissolved solids (potassium iodate, ferric nitrate, etc.) in the concentrated slurry component, have also been used as indicators of slurry quality. The most common component assay is an off-line titration for the specific dissolved solid in question. However, many commercially available slurries contain proprietary ingredients. Thus, composition and concentration information for these slurries is not known and not readily available. Without this information, the use of component assays as a mechanism for monitoring slurry quality is challenging, if not completely impossible. Finally, each of the proposed off-line measurement techniques necessarily require sampling and subsequent analysis outside of the manufacturing process, and thus, do not provide a real-time indicator of slurry quality.

Thus, on-line measurements have been proposed, and are considered generally more attractive, as providing the desired real-time indication of slurry quality. For example, pH and density may be measured on-line. However, neither of these on-line approaches have proven to be an optimal indicator of slurry quality for a variety of reasons. Specifically, the measurement of pH of a chemical slurry may not be an accurate indicator of slurry quality for chemically buffered slurries. Furthermore, even in unbuffered oxide slurries, silica particles can act collectively as a buffering agent. Finally, the reliability of pH as an indicator of slurry health is adversely effected by the limited precision and/or resolution of most pH meters when used on-line. That is, standard pH probes are prone to clogging of the porous probe membrane by the small particles present in a slurry. Thus, frequent regular maintenance of these instruments is required. Furthermore, in order to ensure maximum reliability and accuracy of these instruments, frequent calibration is required.

The measurement of density and the remainder of on-line measurement techniques also fail to provide the consistent, accurate indicator of slurry quality desired in the CMP process. Specifically, although on-line measurement is attractive in that it provides a real-time indicator of slurry quality, many analytical instruments are not easily adapted to on-line sampling. Furthermore, as is the case with pH meters, other on-line instruments also require rigorous maintenance and calibration in operation, rendering them costly and inefficient methods of slurry monitoring.

Thus, there is a need for an efficient, easy-to-use system and process capable of providing a real-time indication of slurry quality.

SUMMARY OF THE INVENTION

According to the present invention, the above objectives and other objectives apparent to those skilled in the art upon reading this disclosure are attained by the present invention which is drawn to a process and system for making and/or monitoring the character of a slurry having a solids content within a qualification range. More specifically, it is an object of the present invention to provide a process and system that utilize conductivity to monitor solids content. By monitoring conductivity on-line while mixing chemical components, the process and system of the present invention provide an exceptionally accurate, reliable, easy-to-use means for monitoring and maintaining the quality of a chemical slurry.

Generally, the process involves providing a reference conductivity value corresponding to a reference slurry having certain desired characteristics, e.g., characteristics indicative of when sufficient amounts of at least two chemical components have been combined to form a slurry with the desired composition. The at least two components are combined, and, when the measured conductivity of the combined components corresponds to the reference conductivity value, the slurry is ready to use. In preferred embodiments, the conductivity is monitored as the at least two components are combined.

For example, the process of the present invention may be used to generate two-component slurries. In such slurries, one of the components, i.e., a first component, typically comprises a first solvent and the other component, i.e., a second component, comprises a second solvent and a plurality of solid particles. A reference conductivity value is provided indicative of when sufficient amounts of the first and second components have been combined to provide a slurry with a solids content within the qualification range. The first and second components are then combined until the combination, i.e., the blended slurry, has a measured conductivity value that corresponds to the reference conductivity value. In this manner, a slurry having a desired solids content is produced.

The process of the present invention is also suitable for the preparation of slurries comprising three or more chemical components. In this embodiment of the invention, both a predetermined order for combining the plurality of components, as well as a reference conductivity value for each combining step, are provided. More specifically, a predetermined order is provided in which the plurality of components are to be combined in a series of steps. Then, as each combining step is performed, the components corresponding to each step are combined until the measured conductivity corresponds to the reference conductivity value associated with the combining step. When all of the combining steps have been completed in this manner, the resultant slurry is ready to use.

In preferred embodiments, the rate of addition of the component comprising a plurality of solid particles may be varied in response to the conductivity measurement, i.e., the addition may be slowed as the measured conductivity approaches the reference conductivity value, and ceased when the measured conductivity of the blended slurry corresponds to the reference conductivity value. Thus, in these preferred embodiments, the process of the present invention provides a real-time, feedback control process for monitoring and/or producing chemical slurries.

The present invention also provides a chemical mixing system for monitoring and/or making a slurry having a desired solids content within a qualification range. Generally, the chemical mixing system comprises a mix volume adapted to receive at least two chemical components from at least first and second supply sources. Additionally, the system comprises a control system that is responsive to a conductivity measurement of the resulting combination as the components are added to the mix volume. More specifically, the control system is capable of generating a control signal in response to the conductivity measurement which, in turn, controls the addition of at least one of the chemical components to the mix volume. In this manner, when the combination of chemical components, i.e., the blended slurry, has a conductivity value corresponding to the reference conductivity value, the addition of the at least one chemical component is ceased.

BRIEF DESCRIPTION OF THE FIGURES

The above mentioned and other advantages of the present invention, and the manner of attaining them, will become more apparent and the invention itself will be better understood by reference to the following description of the embodiments of the invention taken in conjunction with the accompanying drawing, wherein.

DETAILED DESCRIPTION OF THE PREFERRED EMBODIMENTS

Figure 1:
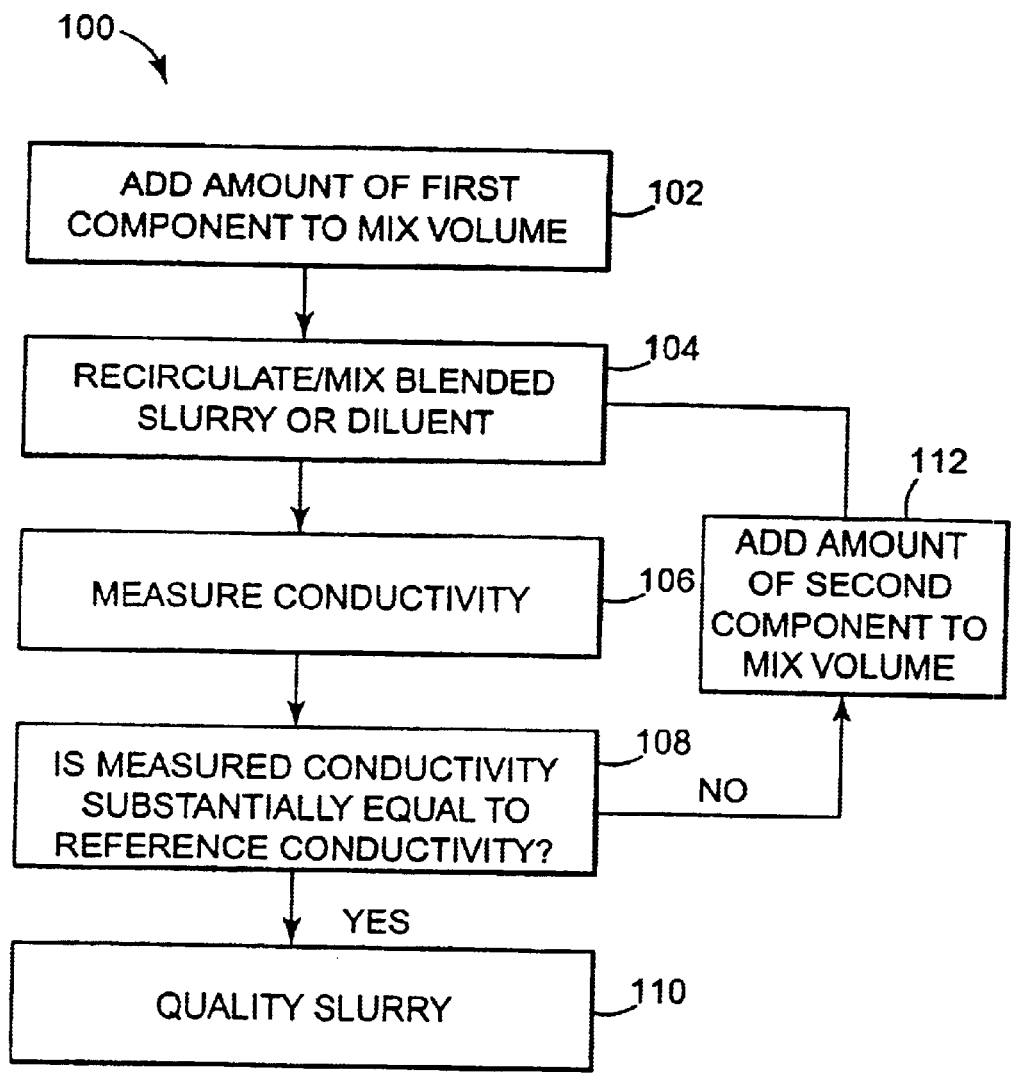
FIG. 1 is a flow diagram of a representative process capable of producing a slurry having a solids content within a qualification range in accordance with the present invention.

The embodiments of the present invention described below are not intended to be exhaustive or to limit the invention to the precise forms disclosed in the following detailed description. Rather the embodiments are chosen and described so that others skilled in the art may appreciate and understand the principles and practices of the present invention.

The present invention represents an improvement in monitoring the quality of and/or producing slurries having a solids content within a qualification range. Specifically, Applicant has found that by providing a reference conductivity value indicative of when a sufficient amount of a first chemical component is combined with a second chemical component and monitoring conductivity during mixing of the components of a chemical slurry, slurries can be produced with a solids content within the qualification range. Additional components can be added in a similar fashion. The present invention thus provides a process and system that are capable of easily and accurately monitoring and/or producing slurries useful in applications wherein a real-time indicator of slurry quality is desired, e.g., as a chemical mechanical polishing process.

Advantageously, the process and system of the present invention offer a higher degree of resolution than currently available on-line monitoring techniques, that rely upon pH or densitometry measurements. For example, typical pH instruments can measure changes in pH of only 0.1, which corresponds to a change in solids content of 9.6% in an oxide slurry and 0.92% in a tungsten slurry. Additionally, although typical densitometry instruments can measure changes in density of 0.001 g/mL, this corresponds to a change in solids content of 0.16% in an oxide slurry and 0.75% in a tungsten slurry. In contrast, a typical conductivity probe can measure changes in conductivity of 0.001 mS/cm in an oxide slurry or 0.01 in a tungsten slurry which correspond to a change in solids content of 0.02% and 0.001%, respectively. Therefore, monitoring conductivity when preparing an oxide slurry can result in an improvement of up to as much as 700 times better resolution than that attainable by monitoring density, and an improvement of up to as much as 900 times better resolution than that attainable by monitoring pH. As a result, conductivity-based feedback control can resolve smaller changes in the solids content of a blended slurry than either pH or density measurements.

FIGS. 1, 2A, 2B and 3 schematically show how the principles of the present invention may be used to monitor and/or produce a chemical slurry with a solids content within a qualification range quickly, economically, and with repeatable accuracy based upon measurements relating to the conductivity of the slurry. Because the principles of the present invention as shown in FIGS. 1, 2A, 2B and 3 are readily applicable to on-line usage, the present invention may be incorporated into feedback control systems and methodologies when preparing slurries for use in, e.g., chemical mechanical polishing processes. The present invention may also be used on-line or off-line for quality control purposes to ensure that chemical slurries being prepared meet desired specifications.

Additionally, it will be understood that, although with relation to FIGS. 1–9, the process and system of the present invention are described as adding a second component comprising a second solvent and a plurality of solid particles to a first component comprising a first solvent, the invention not so limited and the components may be added in any order. This concept is further illustrated by Examples 1 and 2 in which the first component comprising a first solvent is added to the second component, i.e. the component comprising a plurality of solid particles More specifically, FIG. 1 illustrates generally, by flow diagram 100, a process according to the present invention by which a two component slurry may be formed. As shown at step 102, an amount of a first component, typically comprising a first solvent, e.g., deionized (DI) water, is added to a mix volume. The first component is caused to recirculate/mix through the mix volume at step 104. While the first component (or blended slurry) continues to be recirculated/mixed, the conductivity is measured as shown at step 106. If the measured conductivity is substantially equal to the reference conductivity value (step 108), the slurry has a solids content within the qualification range and is ready to be used as shown at step 110. If the measured conductivity is not equal to the reference conductivity value, an amount of a second component, typically comprising a second solvent and a plurality of solid particles, is added to the volume (step 112). Steps 104–108 are then repeated until the measured conductivity substantially corresponds to the reference conductivity value.

FIG. 1 is also generally illustrative of the process that would be utilized to prepare a slurry with three or more components. That is, if a slurry with three or more components is to be prepared, a predetermined order for combining the plurality of components steps is provided, as well as a reference conductivity value for each combining step. Then, for each combining step, the process of FIG. 1 would be carried out. That is, steps 104–108 and 112 of FIG. 1 would simply be repeated each time an additional component was added to the resulting slurry.

Figure 2A:
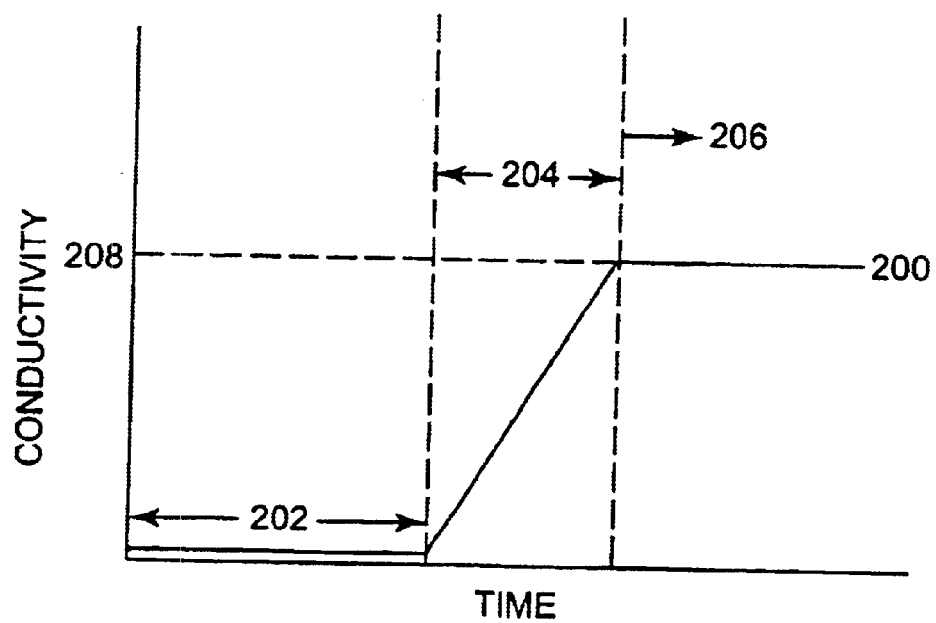
FIG. 2A is a graphical depiction of the relationship between conductivity and time as monitored during the preparation of a two component slurry produced according to the representative process of FIG. 1.

FIG. 2A shows a plotted curve 200 of conductivity versus time for the process of the present invention illustrated generally in FIG. 1. Initially, the mix volume is filled to a desired level with an amount of diluent (step 102). The diluent is then caused to recirculate/mix through the mix volume (step 104) and conductivity measured (step 106). During this period, curve region 202 of FIG. 2A remains flat. Once the second component is caused to flow into the mix volume (step 112) at a generally steady flow rate, the conductivity steadily rises (or, the conductivity could decrease, depending on the nature of the second component. For purposes of illustration, however, the conductivity will be assumed to increase when the second component is added.) from the time that the second component is initially added until the addition of the second component is stopped (curve region 204). Once the flow of the second component has stopped, the conductivity of the blended slurry remains generally constant, and thus, curve region 206 is generally flat. Preferably, the flow of the second component will be stopped when the measured conductivity of the blended slurry is substantially equal to the reference conductivity value, y-axis point 208.

Figure 2B:
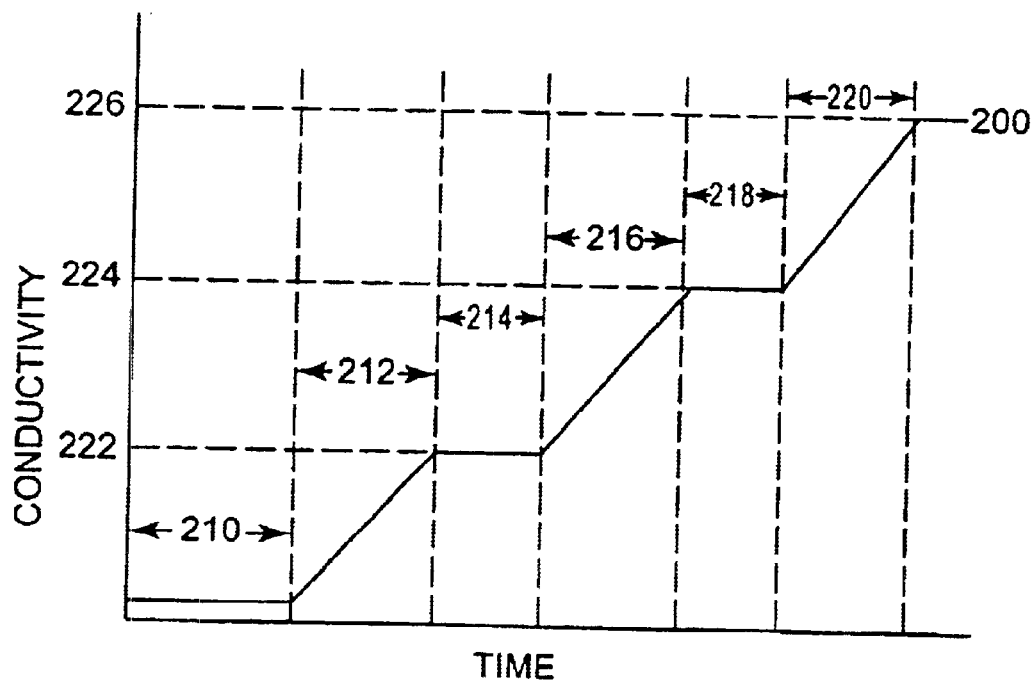
FIG. 2B is a graphical depiction of the relationship between conductivity and time as monitored during the preparation of a four component slurry produced according to the representative process of FIG. 1.

FIG. 2B shows a plotted curve 200 of conductivity versus time for the process of making a slurry with four or more components as described above with relation to FIG. 1. Prior to the addition of a concentrated slurry component, the measured conductivity corresponds to curve region 210 and is generally flat (FIG. 1, step 102). Once a first concentrated slurry component is caused to flow into the mix volume at a generally steady flow rate (FIG. 1, step 112), the conductivity steadily rises until the addition of the concentrated slurry component is ceased (curve region 212). In particular, and with reference to FIG. 1, the addition of the concentrated slurry component is ceased once the monitored conductivity is substantially equal to the reference conductivity value for the step (FIG. 1, step 108; FIG. 2B, y-axis point 222). The blended slurry is then allowed to recirculate/mix for a period of time (FIG. 1, step 104) during which the measured conductivity remains generally constant, and thus, curve region 214 is generally flat.

A second concentrated slurry component may then be added (FIG. 1, step 112). As the second concentrated slurry component is added at a generally constant rate, the conductivity of the blended slurry steadily rises until the addition of the second concentrated slurry component is ceased (curve region 216). Preferably, the addition of the second concentrated slurry component is ceased when the measured conductivity is equal to the reference conductivity value for that combining step (FIG. 1, step 108; FIG. 2B, y-axis point 224). After a period of mixing during which no concentrated slurry component is added (FIG. 1, step 104; FIG. 2B, curve region 218), a third concentrated slurry component may be added. As the third concentrated slurry component is added at a generally constant rate, the conductivity of the resulting blended slurry will steadily rise (curve region 220) until the addition of the third concentrated slurry component is ceased. Preferably, the addition of the third concentrated slurry component is ceased when the measured conductivity is equal to the reference conductivity value for that combining step (FIG. 1, step 108; FIG. 2B, y-axis point 226).

The principles of the present invention can be described more concretely with respect to one exemplary embodiment of a silica based CMP slurry containing 12 weight % ±0.3 weight % silica particles. This kind of chemical slurry is widely used to manufacture semiconductor devices. Such a chemical slurry may be formed on demand by blending a concentrated slurry component (e.g, 30% by weight silica particles in aqueous potassium hydroxide (<1% by weight KOH) solution) into a first component comprising at least a first solvent, e.g., water, in precise amounts effective to provide a blended slurry with a solids content within the desired qualification range.

When blending the concentrated slurry component into the ultrapure water, the conductivity of the blended slurry will tend to increase as the concentration of the concentrated silica component, and hence the solids content which is a component of the concentrated slurry component, increases. Conversely, the conductivity, as well as the solids content, of the blended slurry will tend to decrease as more of the ultrapure water is added to the concentrated slurry component. In other words, the conductivity of the blended slurry is a characteristic that is related to the solids content of the blended slurry. Consequently, inasmuch as the conductivity of the blended slurry is a function of the solids content, the conductivity of the blended slurry may be monitored as an indirect way to determine when precisely enough of the concentrated slurry component has been added to the ultrapure water to provide a slurry with a solids content within the qualification range.

Figure 3:
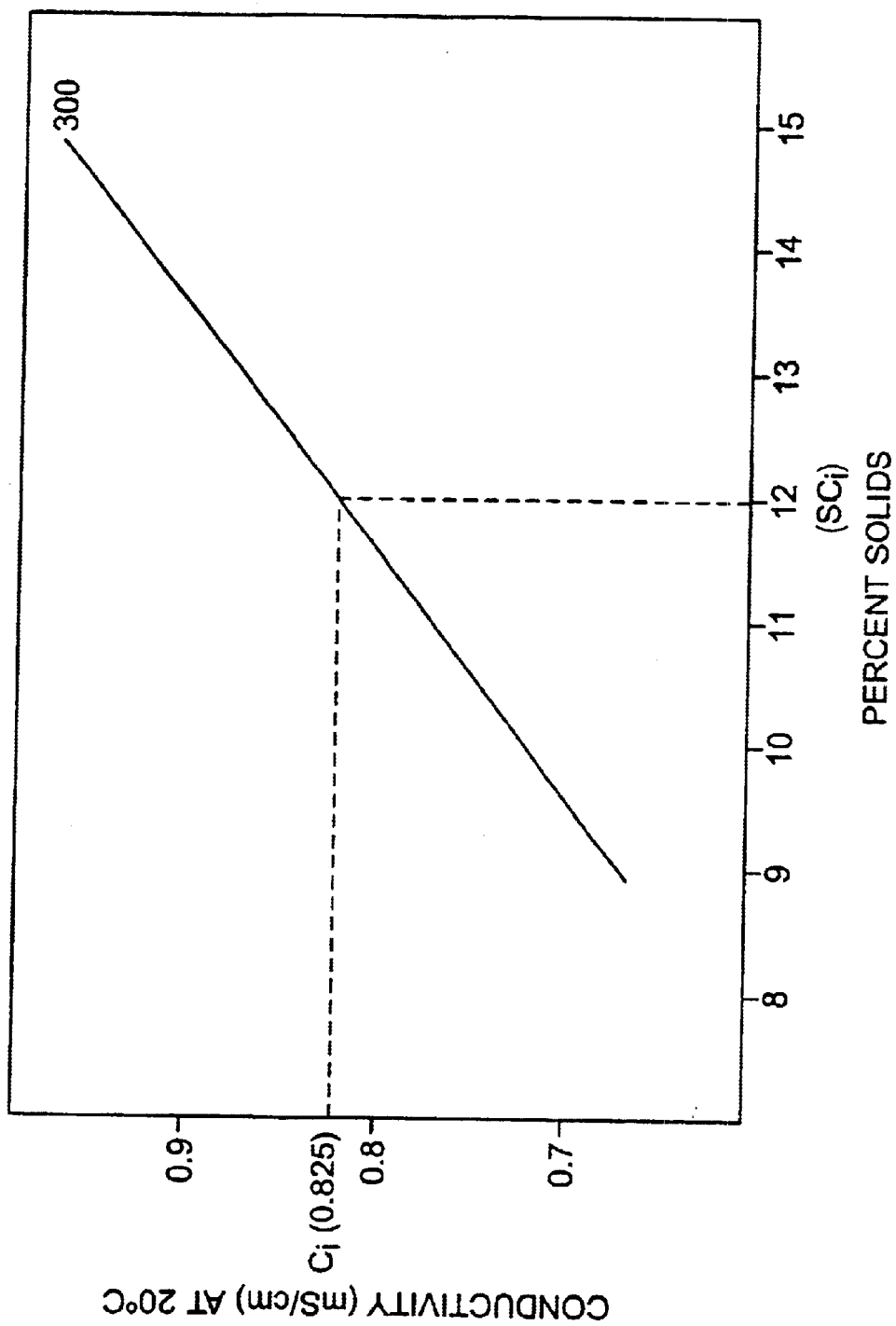
FIG. 3 is a graphical depiction of a conductivity/solids content calibration curve.

Indeed, if one were to determine the conductivity for blended slurries of at least a first component and a second component as a function of the solids content in the resultant blended slurry, then reference data in the form of a conductivity/solids content calibration curve 300 of FIG. 3 would be obtained. Calibration curve 300 allows the solids content in a blended slurry to be quickly and easily determined as soon as conductivity for the blended slurry is measured. For example, if a blended slurry of the above described first component and second component was determined to have a conductivity of $C_i$, calibration curve 300 shows that the blended slurry must have a solids content of $SC_i$.

Figure 4:
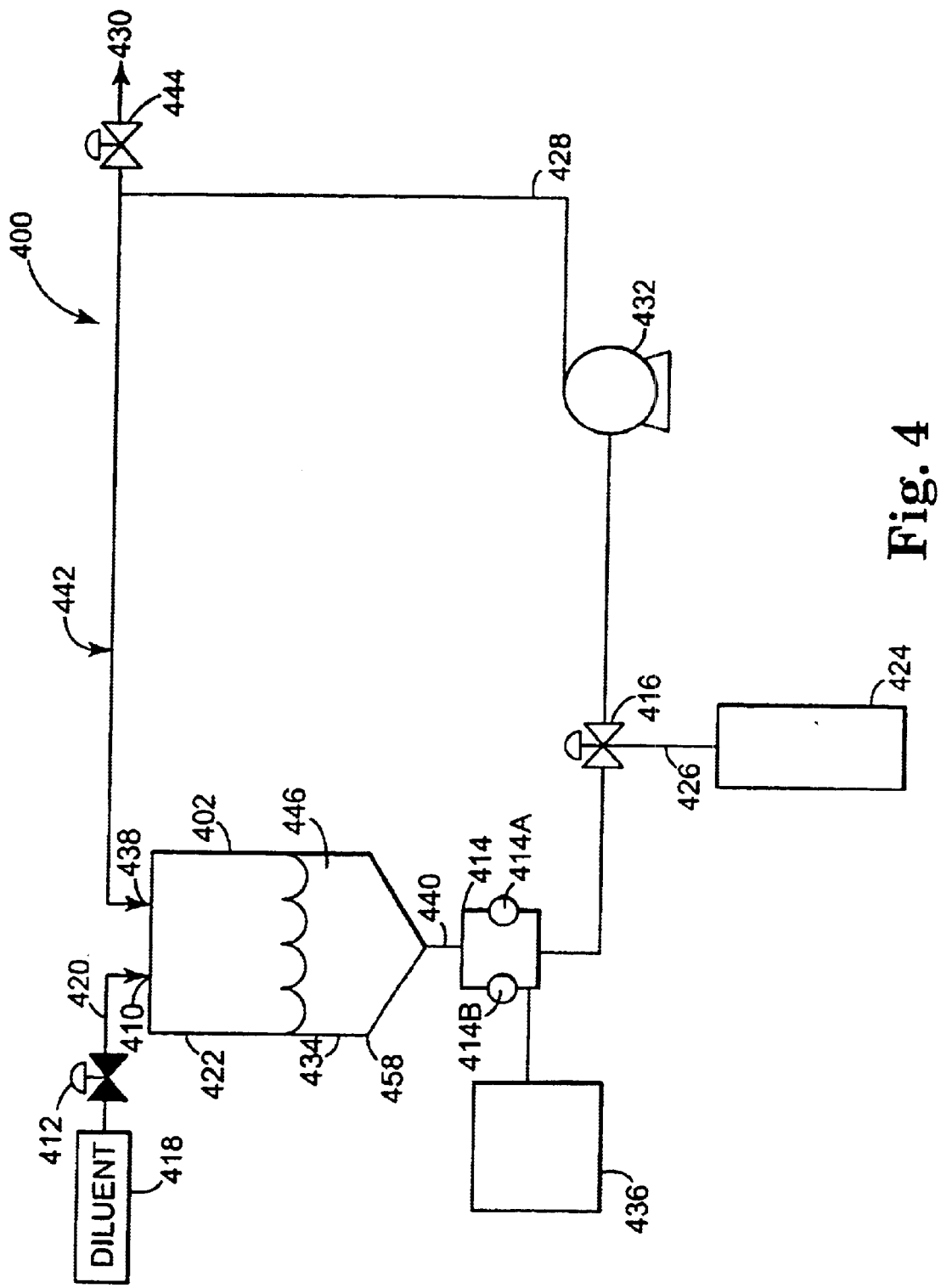
FIG. 4 is a diagram of a representative chemical mixing system capable of producing a slurry having a solids content within a qualification range in accordance with the present invention.

The ability to correlate conductivity of a blended slurry to solids content allows the principles of the present invention to be incorporated into a feedback and/or quality control system for blending chemical slurries. For example, FIG. 4 shows one preferred embodiment of a system 400 for preparing chemical slurries having a solids content within a qualification range. Generally, system 400 includes a mix volume 442 which comprises mix vessel 402 and recirculation loop 428. System 400 further comprises at least first and a second sources of chemical components (e.g., diluent source 418 and concentrated slurry source 424), a control system 436, conductivity assembly 414 and valves 412, 416 and 444. Control system 436 responds to information comprising the measured conductivity of the combination of components and generates control signal(s) to control blending and delivery of slurry 446.

More specifically, diluent source 418 (i.e., a first component source) is fluidly coupled to diluent inlet 410 of mix vessel 402 by diluent supply line 420. The flow of diluent into mix vessel 402 through supply line 420 is controlled by valve 412. Concentrated slurry inlet 426 fluidly connects component source 424 to recirculation line 428. Flow of concentrated slurry into recirculation line 428 is controlled by valve 416. The contents of mix volume 442 are recirculated by pump 432 through recirculation line 428 and mix vessel 402. Recirculation line 428 has intake end 440 and discharge end 438 coupled to mix vessel 402.

At least a portion of an internal surface of mix volume 442 preferably comprises a corrosion resistant material, such as high molecular weight polyethylene, a fluorinated polymer, polypropylene, combinations thereof and the like. More preferably, at least a portion of the internal surface of mix volume 442 comprises a fluorinated polymer such as a perfluoroalkoxy polymer, polytetrafluoroethylene, fluorinated ethylene propylene, polyvinylidene fluoride, ethylene tetrafluoroethylene, chlorotrifluoroethylene or combinations thereof.

Liquid level sensors 434 and 422 are at positions on mix vessel 402 effective to generate a sensor signal indicative of when a desired amount of at least one of the components, e.g., diluent from diluent source 418 or concentrated slurry from component source 424, has been added to mix vessel 402. In this manner, the transport of diluent and/or concentrated slurry to mix vessel 402 may be controlled by control system 436 in response to a signal from sensors 422 and 434. Optional sensor 458 is positioned on mix vessel 402 at a position to detect when mix vessel 402 is substantially empty. Thus, the transport of diluent, concentrated slurry and/or blended slurry from mix vessel 402 may be controlled by control system 436 in response to a signal from sensor 458.

Valve 416 connects concentrated slurry inlet 426 to recirculation line 428. Valve 416 is located in recirculation line 428 between mix vessel 402 and the suction side of pump 432. Valve 416 described herein is similar to that disclosed in U.S. Pat. No. 4,977,929, the disclosure of which is incorporated herein by reference, but modified to be actuated by a pneumatic piston to reduce dead spots that can otherwise result in quiescent quantities of concentrated slurry.

In addition to the at least one sensor described above, control system 436 further comprises at least one conductivity assembly 414 incorporating conductivity probes 414A and 414B in recirculation line 428 in a parallel hydraulic circuit between mix vessel 402 and valve 416. Thus, conductivity probes 414A and 414B measure the conductivity of the blended slurry circulating through mix volume 442. Conductivity probes 414A and 414B are interfaced to control system 436 which is responsive to the conductivity as measured by probes 414A and 414B in a manner described further hereinbelow. Conductivity probe 414A, which can be identical to probes 414B, 814A, 814B (FIG. 8), 914A and 914B (FIG. 9) is described in greater detail with reference to FIG. 5.

Figure 5:
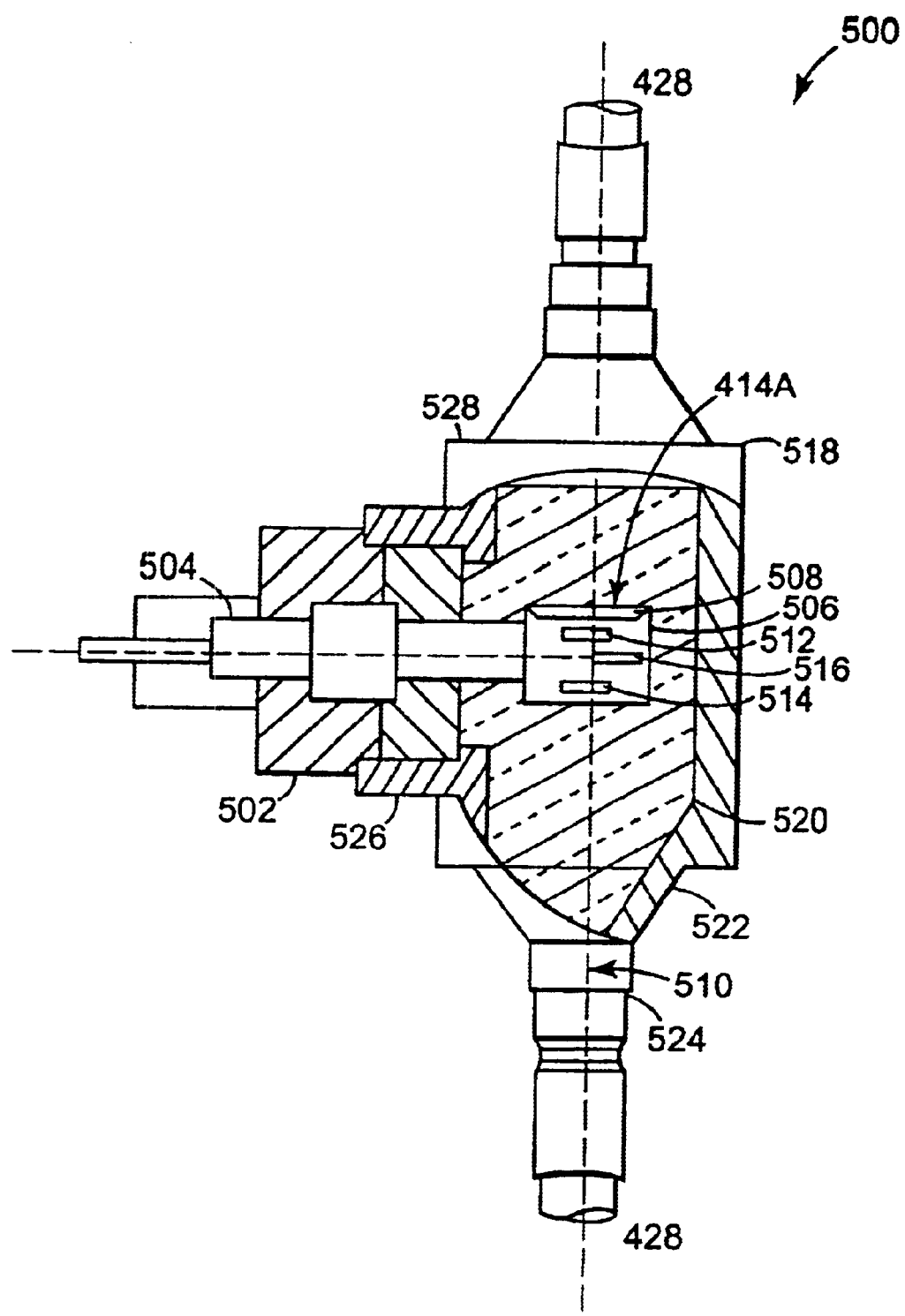
FIG. 5 is a partial cross-sectional view of a preferred conductivity probe suitable for use in the systems of FIGS. 4, 8 and 9.

Referring now to FIG. 5, conductivity probe 414A is mounted within a housing 528 formed of PFA, PVDF or other material resistant to corrosion by the blended slurry. Housing 528 has a generally cylindrical outer wall 518, and tapered end walls 522 providing fittings to couple the housing to recirculation line 428, 828 or 928. The nature of the material from which housing 528 is fabricated and the smooth inner surfaces 520 of wall 518 tend to minimize the collection of gas bubbles on the housing as the blended slurry flows therethrough.

Conductivity probe 414A includes a stem 504 extending through a mounting plug 502. Mounting plug 502 is welded or otherwise secured to a T-shaped opening 526 in housing 528. Probe 414A also include a sensing head 506 on the end of stem 504 within housing 528. Sensing head 506 is annular in shape and has a central opening 508 axially aligned with the centerline 510 of housing 528. Blended slurry flowing through housing 528 therefore flows through the central opening 508 of probe 414A as well. Probe 414A also includes a temperature sensor 516 which is coupled to control system 436 to provide a temperature signal representative of the temperature of the blended slurry flowing through the probe 414A.

Sensing head 506 and stem 504 can be molded as an integral unit from PFA, PVDF or other corrosion-resistant material. A pair of coils 512 and 514 and associated lead wires (not shown in FIG. 5) which extend from stem 504 are embedded within head 506 and the stem while they are being molded. Coils 512 and 514 surround the central opening 508 of head 506. As with housing 528, the material from which stem 504 and head 506 are fabricated and the smooth surfaces of these components minimizes the collection of gas bubbles on probe 414A as the blended slurry flows through and by probe 414A.

Figure 6:
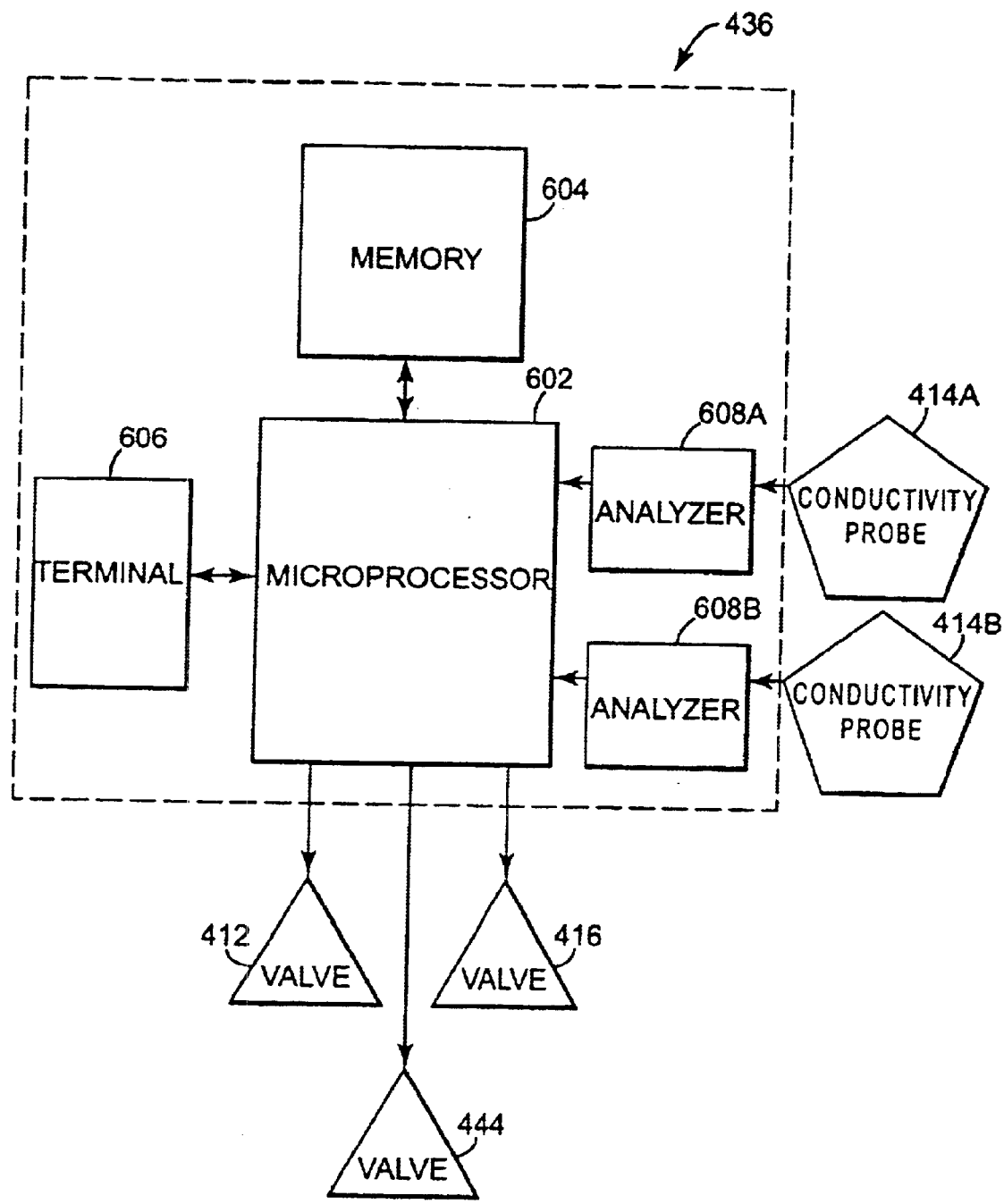
FIG. 6 is a block diagram of a programmable logic control (PLC) system for operating the chemical mixing systems shown in FIGS. 4, 8 and 9 in accordance with the present invention.

Control system 436 used to control the operation of the embodiments of the chemical mixing system shown in FIG. 4 is illustrated in more detail in FIG. 6. Although operation of control system 436 will be described with reference to the embodiment of the chemical mixing system shown in FIG. 4, it is to be understood that the same principles of operation will apply to the embodiments of the chemical mixing systems shown in FIGS. 8 and 9.

As shown, control system 436 includes microprocessor 602 and associated memory 604. Conductivity probes 414A and 414B, as well as corresponding temperature sensors 516A and 516B (not shown), are interfaced to microprocessor 602 through respective analyzers 608A and 608B. Valves 416, 412 and 444 are also interfaced directly to the microprocessor 602. An operator can interface with control system 436 through a terminal 606. Data representing information indicative of conductivity setpoints, process control values and/or a slurry blending control program is stored in memory 604. Microprocessor 602 executes the chemical mixing control program as a function of the conductivity setpoints, process control values and the conductivity measurements made by conductivity assembly 414, and in response opens and closes valve 416 to regulate the flow of concentrated slurry into mix volume 442. Alternatively, microprocessor 602 may open and close valve 412 to regulate the flow of diluent into mix volume 442. The chemical components can thus be quickly blended to the desired concentration with a high degree of accuracy.

As mentioned hereinabove, conductivity probes 414A and 414B are interfaced to microprocessor 602 through analyzers 608A and 608B, respectively. Analyzers 608A and 608B drive probes 414A and 414B, and also process signals received from the sensors to generate digital output that is subsequently sent to microprocessor 602. Analyzers such as 608A and 608B are well known and commercially available from a number of manufacturers such as Great Lakes Instruments of Milwaukee, Wis.

Briefly, and with reference to probe 414A illustrated in FIG. 5, coil 512 is energized by an AC drive signal from analyzer 608A to create an inductive field. The inductive field establishes an electric current in the blended slurry flowing by sensor head 506. The magnitude of the electric current established in the blended slurry is directly related to the conductivity, and therefore solids content, of the blended slurry. The current established in the blended slurry induces a sense current signal in coil 514, and the magnitude of the sense current signal is also directly related to the conductivity of the blended slurry. The sense current signal is digitized by analyzer 608A to produce an uncompensated digital conductivity value.

Analyzers 608A and 608B also include stored conductivity data which relates the monitored conductivity values of the blended slurry to the solids content of the blended slurry at a predetermined temperature (e.g., 25° C). The relationship between the conductivity values generated by probe 414A and the actual solids content of the blended slurry is also dependent upon the temperature of the blended slurry. Analyzers 608A and 608B therefore also preferably include temperature compensation data characterizing the relationship between conductivity values at the temperature for which the conductivity data is established, and the actual temperature of the blended slurry. The uncompensated digital conductivity value is processed by analyzers 608A and 608B as a function of the measured temperature of the blended slurry and the temperature compensation data to generate compensated digital conductivity values.

Microprocessor 602 compares the conductivity values generated from the probes 414A and 414B to each other, and performs a deviation analysis to monitor the operation of the probes. If probes 414A and 414B are both operating properly, the conductivity values generated by these probes will generally be substantially equal to one another within a predetermined range of deviation. If the conductivity readings from probes 414A and 414B are equal to one another within the predetermined range of deviation, microprocessor 602 will use the conductivity measurements to control the operation of mixing system 400. If at any time microprocessor 602 determines that the conductivity values are not equal (i.e., outside the predetermined range of deviation), control system 436 will stop or discontinue the operation of mixing system 400, and provide a corresponding error message on terminal 606. Mixing system 400 and/or control system 436 can then be serviced to identify and correct the fault.

The manner by which control system 436 operates mixing system 400 to blend diluent with concentrated slurry to obtain blended slurry having the desired solids content can be described generally with reference to FIGS. 4 and 6. The mixing control program executed by microprocessor 602 to control the operation of valve 416 and valve 412 is stored in memory 604. Also stored in memory 604 is data characterizing a number of setpoints, i.e., reference conductivity values and process control values, used by the mixing control program. The setpoints and process control values are dependent on the specific type of blended slurry being produced by mixing system 400 (e.g., on the type of diluent and concentrated slurry) and the mixing algorithm being implemented by the mixing control program. The setpoints and process control values may initially be input by an operator into terminal 606 and may be either in terms of conductivity or of solids content of the blended slurry. For purposes of illustration, the setpoints and process control values will be discussed in terms of conductivity. The mixing control program executed by control system 436 described herein makes use of the following setpoints and process control values.

1. Desired Qualification Setpoint
2. Upper Qualification Range Setpoint
3. Lower Qualification Range Setpoint
4. Coarse Blend Setpoint
5. Fine Blend Setpoint
6. Concentrated Slurry Injection Constant
7. Diluent Injection Constant The Desired Qualification Setpoint is a value representing the desired or nominal blended slurry conductivity. An operator will typically enter the Desired Qualification Setpoint into control system 436 through terminal 606. The Upper and Lower Qualification Range Setpoints are blended slurry conductivity values above and below the Desired Qualification Setpoint, respectively, that represent the qualification range of solids content that is desired. The Upper and Lower Qualification Range Setpoints can be programmed directly into control system 436 through terminal 606. Alternatively, a conductivity error value or other specification describing a qualification range of acceptable blended slurry solids content values can be programmed into control system 436, and used by the control system 436, along with the Desired Qualification Setpoint, to compute the Upper and Lower Qualification Range Setpoints.

The Coarse Blend Setpoint is a value representing a blended slurry conductivity that is used to control the rate of initial injection or addition of concentrated slurry into the recirculation line 428. As is described in greater detail below, during the initial period in which concentrated slurry is added to diluent, concentrated slurry is preferably continuously added to the recirculation line 428 to quickly increase the conductivity of the blended slurry as long as the conductivity measurements provided by conductivity probes 414A and 414B indicate that the blended slurry conductivity is less than the Coarse Blend Setpoint. The Coarse Blend Setpoint therefore represents a conductivity which is sufficiently less than the Desired Qualification Setpoint such that the substantially continuous addition of concentrated slurry will cause the conductivity of the blended slurry to approach, but not exceed or overshoot, the Desired Qualification Setpoint if the addition of concentrated slurry is stopped when the conductivity measurements provided by probes 414A and 414B indicate that the blended slurry conductivity has increased to the Coarse Blend Setpoint. The Coarse Blend Setpoint can be empirically determined by observing the operation of chemical mixing system 400, and then programmed into control system 436 through terminal 606. Typically, the Coarse Blend Setpoint is about 5% below the Desired Qualification Setpoint.

The Fine Blend Setpoint is a value representing a blended slurry conductivity which is greater than the Coarse Blend Setpoint, but less than the Lower Qualification Range Setpoint. Once the Course Blend Setpoint has been reached, the rate of addition of concentrated slurry is preferably adjusted accordingly, i.e., the relatively continuous addition may be altered so as to be intermittent, or alternatively, continuous addition may be maintained at a slower rate. Once the Fine Blend Setpoint is reached, the rate of addition is preferably adjusted a second time. The Fine Blend Setpoint therefore represents a conductivity which is sufficiently less than the Desired Qualification Setpoint such that the rate of addition of concentrated slurry will cause the conductivity of the blended slurry to approach, but not exceed or overshoot, the Desired Qualification Setpoint if the addition of concentrated slurry is stopped when the conductivity measurements provided by probes 414A and 414B indicate that the blended slurry conductivity has increased to the Fine Blend Setpoint. The Fine Blend Setpoint can be empirically determined and programmed into control system 436 through terminal 606. Typically, the Fine Blend Setpoint is about 2% below the Desired Qualification Setpoint.

The Concentrated Slurry Injection Constant is a process value characterizing the relationship between a parameter of chemical mixing system 400 that can be controlled by control system 436, and corresponding changes to the conductivity of the blended slurry. In the embodiment of chemical mixing system 400 described herein, the Concentrated Slurry Injection Constant is representative of the relationship between the length of time that valve 416 is opened and associated changes (increases) in the blended slurry conductivity. In particular, the Concentrated Slurry Injection Constant is a value characteristic of the reciprocal of the rate of change of the conductivity of the blended slurry solids per unit of time that valve 416 is open. The Concentrated Slurry Injection Constant can be empirically determined and programmed into control system 436 through terminal 606. As described in greater detail below, control system 436 can also update the Concentrated Slurry Injection Constant on-line on the basis of monitored changes in conductivity to increase the accuracy of mixing system 400.

The Diluent Injection Constant is a process value characterizing the relationship between the length of time that valve 412 is opened and associated changes (decreases) in the blended slurry conductivity. In particular, the Diluent Injection Constant is a value characteristic of the reciprocal of the rate of change in conductivity per unit of time that valve 412 is open. The Diluent Injection Constant can be empirically determined and programmed into control system 436 through terminal 606. As described in greater detail below, control system 436 can also update the Diluent Injection Constant on-line on the basis of monitored changes in conductivity to increase the accuracy of mixing system 400.

For example, at the start of a production run to produce a two-component slurry, valve 416 is open while valves 412 and 444 are closed Mix vessel 402 is thus initially filled with concentrated slurry from concentrated slurry source 424. When the level of concentrated slurry reaches a level such that the concentrated slurry can be detected by sensor 434, sensor 434 would generate a signal. Control system 436 would, in turn, generate a control signal effective to stop the flow of concentrated slurry by closing valve 416. Pump 432 would then be activated and would motivate concentrated slurry through system 400 via recirculation line 428. Control system 436 would then generate a control signal to open valve 412. Diluent would thus be transported from diluent source 418 to mix vessel 402, where diluent would be combined with concentrated slurry. In this manner, the diluent would be mixed with the concentrated slurry to produce the blended slurry.

Once the conductivity as measured by conductivity probes 414A and 414B is within the qualification range, control system 436 generates a control signal that closes valve 412. In this manner, a blended slurry with a solids content within a qualification range is produced by chemical mixing system 400.

Blended slurry from system 400 is delivered to a point of use (not shown) through discharge line 430. In the embodiment shown, discharge line 430 is coupled to recirculation line 428 at a point between pump 432 and mix vessel 402. Valve 444 is used to control the discharge of blended slurry through line 430.

Figure 7A:
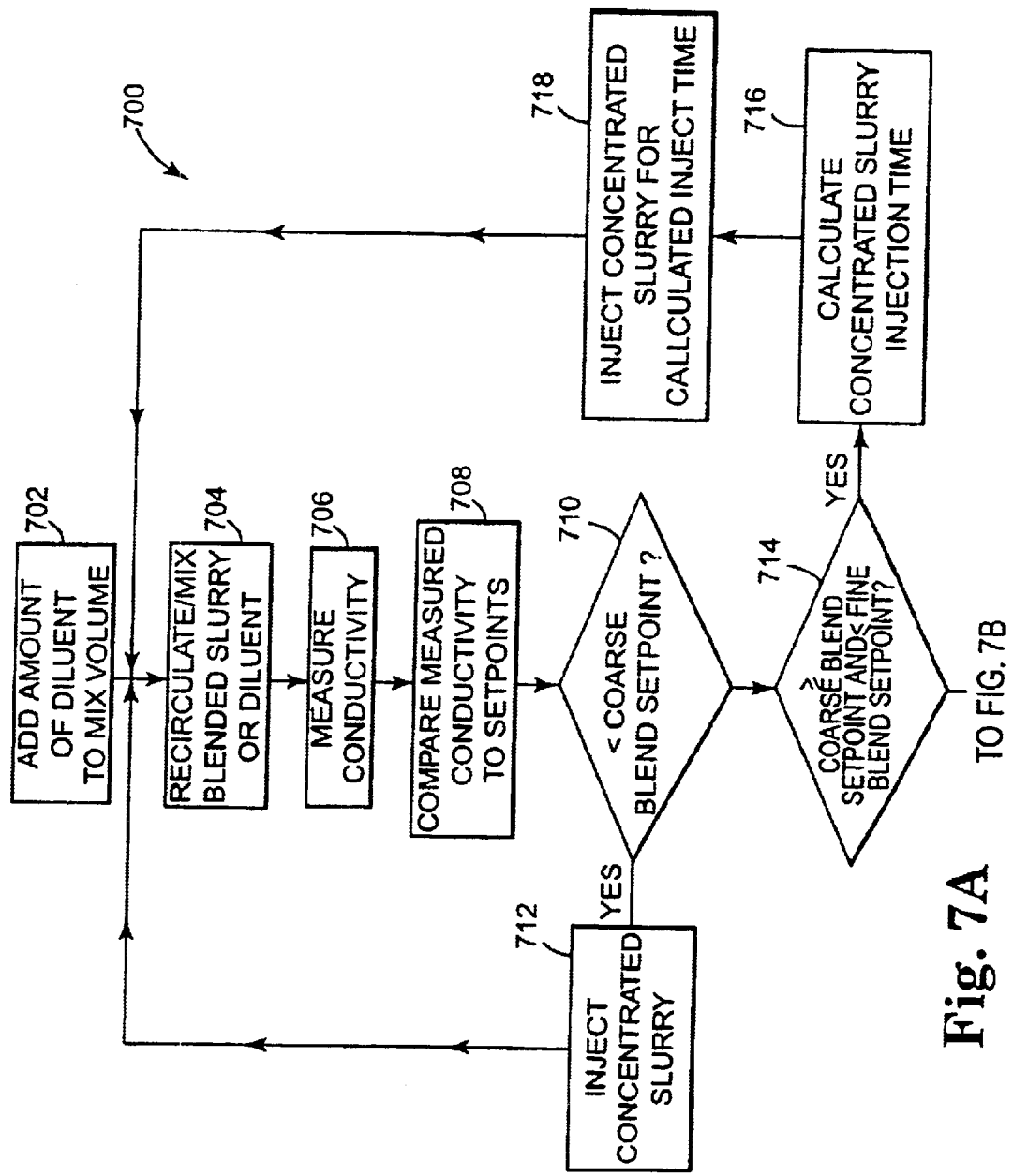
FIGS. 7A and 7B are a flow diagram of chemical blending program executed by the control system shown in FIG. 6.
Figure 7B:
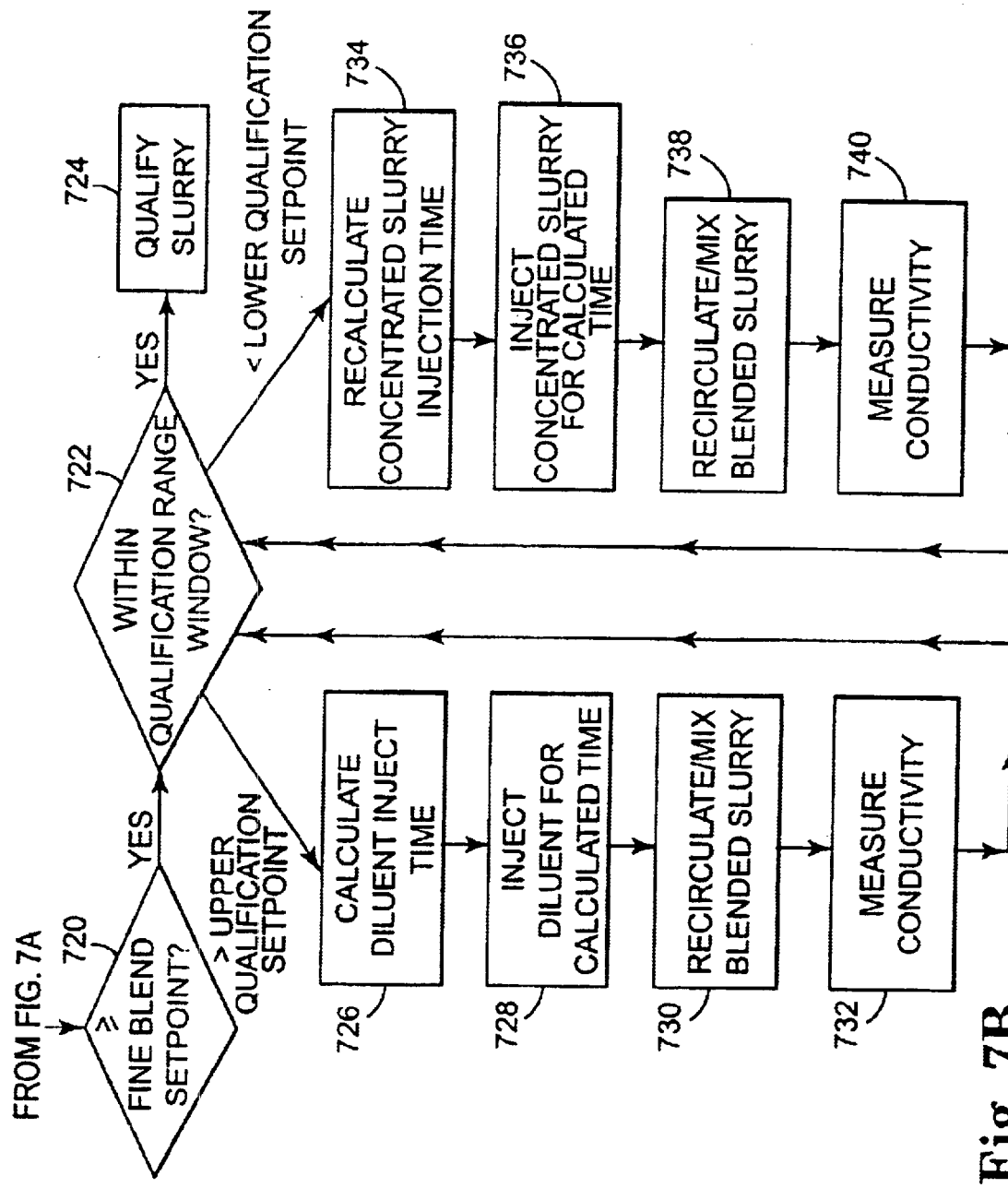

More specifically, FIGS. 7A and 7B show a flow diagram of one preferred methodology 700 of the present invention in which conductivity data is used as a feedback control to accurately provide a blended slurry having a solids content between the Upper and Lower Qualification Range Setpoints.

Thus, as shown at step 702 microprocessor 602 begins the mixing process by opening valve 412 to fill mix vessel 402 with a desired amount of diluent, as detected by liquid level sensor 434 Once mix vessel 402 has been filled to a level detectable by liquid level sensor 434 liquid level sensor 434 generates a signal that is transmitted to microprocessor 602 Control system 436 would, in turn, generate a control signal which causes valve 412 to close. Pump 432 is then actuated to continually recirculate the diluent through mix vessel 402 and recirculation line 428 as shown at step 704. Before initiating subsequent steps of the mixing method shown in FIG. 7A, pump 432 is allowed to recirculate the blended slurry (or initially, only the diluent) for a predetermined length of time to thoroughly mix the diluent and concentrated slurry and generate a homogeneous blended slurry.

After the mixing operation at step 704 the conductivity of the blended slurry within mix vessel 402 and recirculation line 428 is monitored by conductivity assembly 414 This monitoring activity is shown at step 706 The measured conductivity is then compared to the setpoints including the Desired Qualification Setpoint, Upper and Lower Qualification Range Setpoints, and the Coarse and Fine Blend Setpoints. This comparison is indicated by step 708 in FIG. 7A.

If the comparison performed at step 708 indicates that the blended slurry conductivity is less than the Coarse Blend Setpoint (step 710) (e.g., at the beginning of the mix cycle), microprocessor 602 either opens valve 416 or keeps valve 416 open, to continue to add concentrated slurry to recirculation line 428 This step is shown at 712 in FIG. 7A and results in the mixture of the added concentrated slurry with the blended slurry within the recirculation line 428 Steps 704–712 are then continuously repeated as shown in FIG. 7A until the measured conductivity of the blended slurry reaches the Coarse Blend Setpoint. The continuous injection of concentrated slurry in this manner will cause the conductivity of the blended slurry to relatively quickly increase to the value represented by the Coarse Blend Setpoint.

After the comparison performed at step 710 indicates that the conductivity of the blended slurry has increased to a value which is greater than or equal to the Coarse Blend Setpoint, but less than or equal to the Fine Blend Setpoint (step 714), microprocessor 602 closes valve 416 Microprocessor 602 then calculates the length of time that valve 416 should be opened to add enough concentrated slurry to recirculation line 428 to increase the blended slurry conductivity to the Fine Blend Setpoint. These steps are shown generally at 716 and 718 in FIG. 7A. In particular, at step 716 microprocessor 602 computes the difference between the Fine Blend Setpoint and the most recent measurement of the blended slurry conductivity at step 706 This difference is then multiplied by the Concentrated Slurry Injection Constant to compute the length of time that valve 416 should be opened. As shown at step 718, microprocessor 602 then opens valve 416 for the computed concentrated slurry injection time in an attempt to increase the conductivity of the blended slurry to the Fine Blend Setpoint. Upon the completion of step 718 steps 704–710 and 714–718 are repeated until the Fine Blend Setpoint is reached or exceeded (Step 720).

If the comparison performed at step 722 indicates that the conductivity is within the qualification range window (e.g., greater than or equal to the Lower Qualification Range Setpoint but less than or equal to the Upper Qualification Range Setpoint), the mixing process is complete and the batch of blended slurry is qualified for subsequent use as indicated by step 724.

If the comparison performed at step 722 indicates that the blended slurry conductivity is still less than the Lower Qualification Range Setpoint, microprocessor 602 will calculate the length of time that valve 416 should be opened to inject or add enough concentrated slurry to recirculation line 428 to increase the blended slurry conductivity to the Desired Qualification Setpoint. These steps are shown generally at 734 and 736 in FIG. 7B. In particular, at step 734 microprocessor 602 computes the difference between the Desired Qualification Setpoint and the most recent measurement of the blended slurry conductivity at step 706 This difference is then multiplied by the Concentrated Slurry Injection Constant to compute the length of time that valve 416 should be opened. As shown at step 736 microprocessor 602 then opens valve 416 for the computed concentrated slurry inject time to increase the conductivity of the blended slurry to the Desired Qualification Setpoint. Upon completion of step 736 the blended slurry is recirculated and mixed for a predetermined length of time (step 738), and steps 722 and 734–740 are repeated until the blended slurry has a conductivity within the qualification range window.

If the comparison performed at step 722 indicates that the measured conductivity is greater than the Upper Qualification Range Setpoint, microprocessor 602 will calculate the length of time that valve 412 should be opened to inject or add enough diluent to recirculation line 428 to decrease the blended slurry conductivity to the Desired Qualification Setpoint. These steps are shown generally at 726 and 728. In particular, at step 726, microprocessor 602 computes the difference between the Desired Qualification Setpoint and the most recent measurement of the blended slurry conductivity at step 706. This difference is then multiplied by the Diluent Injection Constant to compute the length of time that the valve 412 should be opened. As shown at step 728, microprocessor 602 then opens valve 412 for the computed diluent inject time in an attempt to decrease the conductivity of the blended slurry to the Desired Qualification Setpoint. Upon completion of step 728, the blended slurry is recirculated and mixed for a predetermined length of time (step 730), and steps 722 and 726–732 are repeated until the blended slurry has a conductivity within the qualification range window.

The accuracy of the chemical mixing procedure performed by system 400 and control system 436 can be increased by updating the Concentrated Slurry Injection Constant and/or the Diluent Injection Constant as a function of the actual blended slurry conductivity changes induced by the injection of concentrated slurry at steps 712, 718 and 736 or the injection of diluent at step 728. By way of example, both before and after the injection of concentrated slurry at step 718, the conductivity of the blended slurry will be measured at step 706. Control system 436 can therefore compute an effective Concentrated Slurry Injection Constant by taking the reciprocal of the difference between the measured conductivity values before and after the injection of concentrated slurry at the associated step 718, and multiplying this difference by the length of time that valve 416 was opened to achieve that conductivity change during the associated step 718.

The current value of the Concentrated Slurry Injection Constant stored in memory 604 can then be updated by control system 436 as a function of the currently stored value and the just-computed effective Concentrated Slurry Injection Constant. This update calculation can be performed as a function of running and/or weighted averages of the just-calculated effective Concentrated Slurry Injection Constant, the currently stored value of the Concentrated Slurry Injection Constant, and any number of previous Concentrated Slurry Injection Constants. Procedures of this type can also be used to update the Concentrated Slurry Injection Constant after the performance of step 712, 718 or 736, and to update the Diluent Injection Constant after the performance of step 726.

Optionally, the control system 436 can calculate the Concentrated Slurry Injection Time at steps 716 and 734 using a "target" concentration less than the Desired Qualification Setpoint by a predetermined amount. This approach minimizes the chances that control system 436 will "overshoot" the Upper Qualification Range Setpoint when performing concentrated slurry addition steps 718 and 736. Conversely, control system 400 can calculate the Diluent Injection Constant at step 726 using a target concentration higher than the Desired Qualification Setpoint by a predetermined amount. This approach will minimize the chances that control system 436 will overshoot the Lower Qualification Range Setpoint when performing diluent addition step 728.

Figure 8:
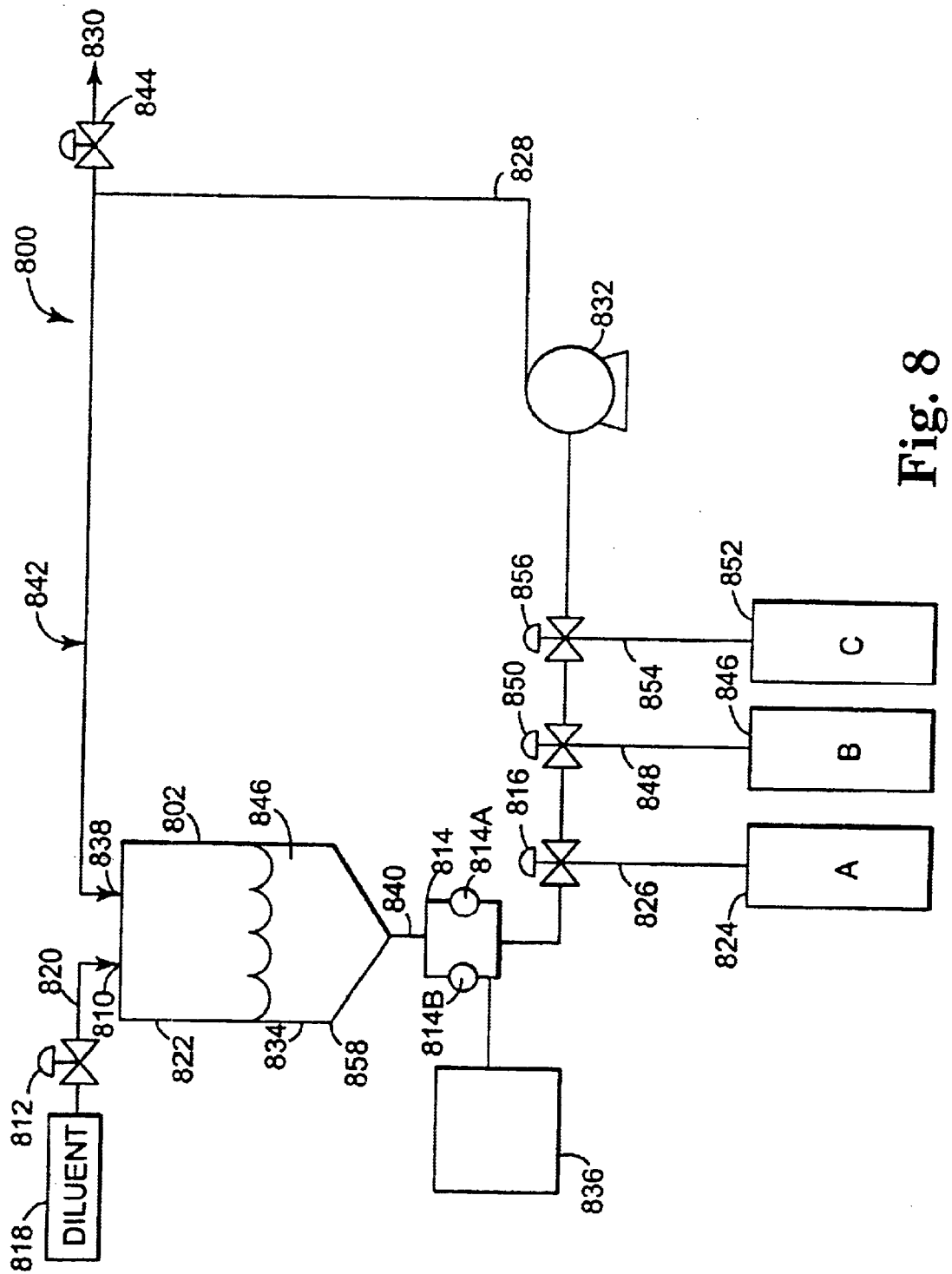
FIG. 8 is a diagram of a second representative chemical mixing system capable of producing a slurry having a solids content within a qualification range in accordance with the present invention.

Referring now to FIG. 8, there is illustrated a second embodiment of a chemical mixing system 800 in accordance with the present invention. Specifically, mixing system 800 represents an embodiment of the invention wherein 2, 3 or 4 component slurries may be prepared. Features of system 800 which are functionally and/or structurally similar to those of system 400 of FIG. 4 are identified in FIG. 8 by the same number incremented by 400 (i.e., inlet 426 of FIG. 4 is inlet 826 of FIG. 8) and will not be discussed further, except as in relation to the operation of chemical mixing system 800.

Chemical mixing system 800 has provided thereon, in addition to those components discussed above in relation to FIG. 4, slurry component supply lines 826, 848 and 854, which are each configured to be fluidly connected to respective sources of slurry components, 824, 846, and 852. Slurry component supply lines 826, 848 and 854 also are coupled to recirculation line 828 by valves 816, 850 and 856, respectively. The concentration of the blended slurry recirculating through line 828 is measured, and valves 816, 850 and 856 controlled, in the same manner as described in relation to FIG. 4.

In operation, then, chemical mixing system 800 would operate to prepare a four component chemical slurry as follows. Valve 816 is opened, while valves 812, 850 and 856 are closed. Mix vessel 802 would initially be filled with concentrated slurry component A from concentrated slurry component A source 824. When the level of concentrated slurry component A reaches a level such that the concentrated slurry can be detected by sensor 834, sensor 834 would generate a signal that is transmitted to control system 836. Control system 836 would, in turn, generate a control signal to close valve 816. Pump 832 would then be activated to motivate concentrated slurry component A through mix volume 842, including mix vessel 802, recirculation line 828 and conductivity assembly 814. Control system 836 would then generate a control signal to open valve 850, thus adding concentrated slurry component B from concentrated slurry component B source 846 to recirculation line 828. While the combined components from sources 824 and 846 are recirculating through recirculating line 828, the conductivity of the combination is monitored by conductivity assembly 814. When the conductivity of the combined components corresponds to a reference conductivity value for the combining step, control system 836 would generate a signal closing valve 850.

Control system 836 would then generate a signal to open valve 856, thus adding concentrated slurry component C from concentrated slurry component C source 852 to mix volume 842. Again, the conductivity of the combined components recirculating through mix vessel 802 and recirculation line 828 is monitored by conductivity assembly 814. When the conductivity of this combination of components reaches a reference conductivity value for the combining step, control system 836 would generate a signal to close valve 856. Control system 836 would then open valve 812, thereby adding diluent from diluent source 818 to mix volume 842. The conductivity of the recirculating combination is monitored by conductivity assembly 814 until the monitored conductivity value corresponds substantially with the reference conductivity value for the combining step, at which time control system 836 would generate a signal to close valve 812. Thus, a slurry with a solids content within a qualification range would be produced. Control system 836, on demand, then opens valve 844 to deliver the resultant slurry to a point of use (not shown) through line 830.

Figure 9:
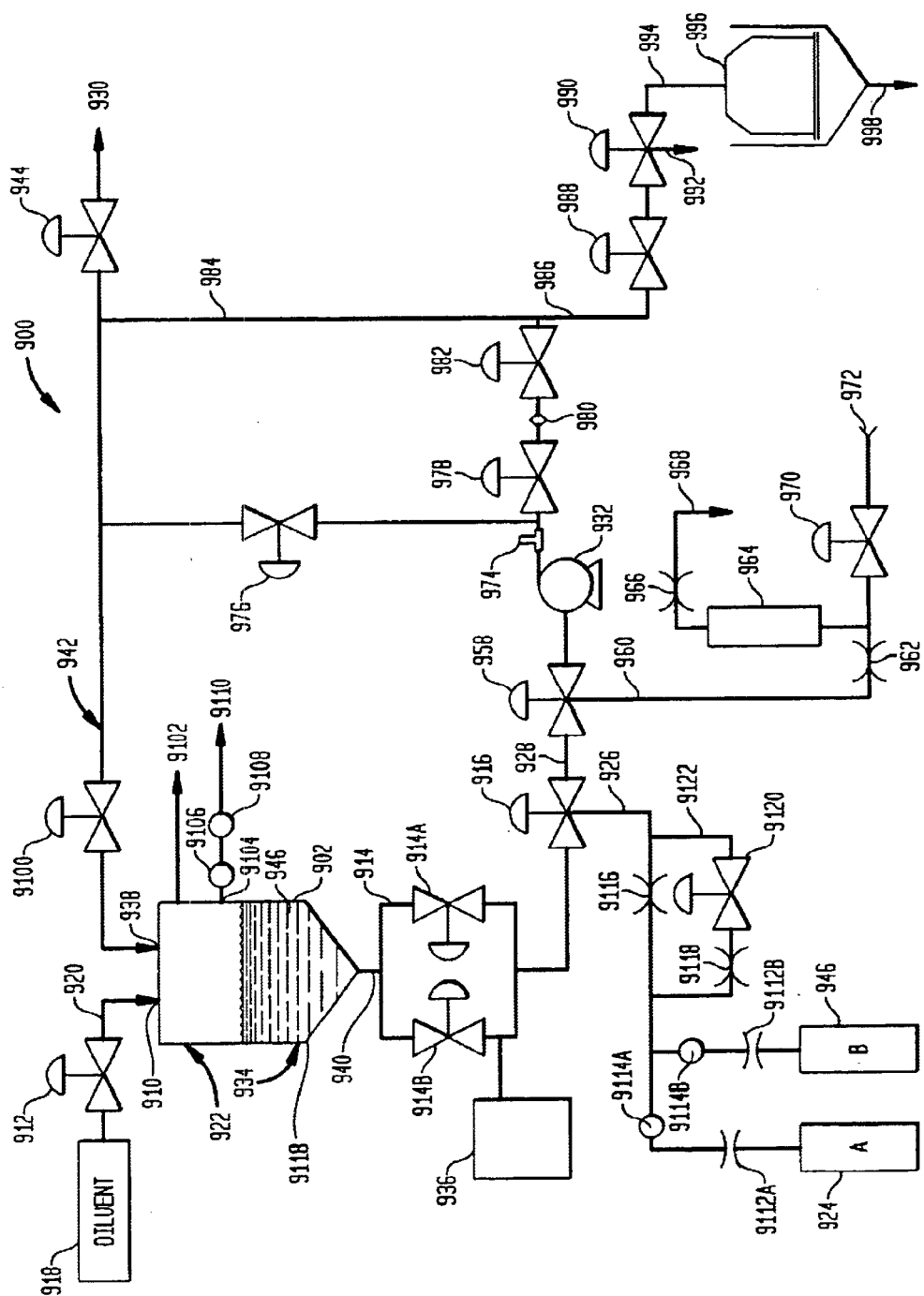
FIG. 9 is a diagram of a third representative chemical mixing system capable of producing a slurry having a solids content within a qualification range in accordance with the present invention.

Referring now to FIG. 9, there is illustrated a third embodiment of a chemical mixing system 900 in accordance with the present invention. Specifically, mixing system 900 represents an embodiment of the invention including components that may optionally be employed in chemical mixing systems 400 and 800. Features of system 900 which are functionally and/or structurally similar to those of system 400 of FIG. 4 are identified in FIG. 9 by the same number as FIG. 4 incremented by 500, and will not be discussed further.

Inlets 9112A and 9112B are each independently connected to slurry component supply line 926 through valves 9114A and 9114B, respectively. The flow rate of slurry components through supply line 926 can be regulated by orifices 9116 and 9118. Orifice 9118 and valve 9120 are connected in series with one another and in a shunt line 9122 around orifice 9116. Orifice 9118 is configured to regulate a different and typically larger flow of slurry component than orifice 9116. Chemical mixing system 900 can therefore be quickly reconfigured for blending different slurry components and different concentration ranges of the same slurry. Additional shunt lines (not shown) can also be included to expand the concentration ranges over which system 900 can operate.

Chemical mixing system 900 further comprises inlet 9110, which couples a source of process nitrogen to mix vessel 902 by supply line 9104. Process nitrogen may optionally be used as inert tank makeup gas and to provide a blanket which separates the blended slurry from air to prevent the unwanted reaction that would otherwise occur between the blended slurry and air. Supply line 9104 includes a regulator 9106 and filter 9108. An exhaust line 9102 extends from mix vessel 902 to vent excess gas from mix vessel 902.

Surge suppresser 974 may optionally be provided in recirculation line 928 immediately downstream from pump 932. Valves 976 and 9100 are also included in recirculation line 928 in the illustrated embodiment of chemical mixing system 900. Specifically, valves 976 and 9100 are in series with one another between surge suppresser 974 and the discharge end 938 of the recirculation line 928.

A filter line 984 may optionally be connected in parallel with valve 976. As shown, filter line 984 includes a filter 980, and valves 978 and 982. Valves 978 and 982 are positioned on opposite sides of filter 980.

A drain and sample collecting line 986 may optionally be connected to the filter line 984, and includes valve 988 and valve 990. A first outlet port of valve 990 is connected to drain line 992. A second outlet port of valve 990 is coupled to sample bottle 996 and associated drain line 998 through sample line 994. When actuated by control system 936, valve 990 can connect the drain and sample collecting line 986 to either drain line 992 or sample line 994.

Inlet 972 is also connected to a source of diluent and is coupled to recirculation line 928 through diluent line 960 and valve 958. Valve 958 can be identical to valve 916 (described above) and is located in recirculation line 928 between valve 916 and pump 932 in the embodiment shown. Since valve 958 is positioned adjacent to the suction side of pump 932, diluent from supply line 960 will be drawn into recirculation line 928 when valve 958 is open. Valve 958 is capable of accurately regulating the flow of diluent into recirculation line 928 when opened, and the rate of this flow can be empirically determined.

Valve 970 and orifice 962 are included in diluent line 960 to control and regulate the flow of diluent to valve 958. System 900 also includes a column 964 coupled to line 960 between valve 970 and orifice 962. Column 964 is connected to a drain line 968 through orifice 966. In practice, column 964 can be periodically replenished with diluent by opening valve 970, thereby maintaining a fresh supply of diluent within column 964 for subsequent addition to the blended slurry in recirculation line 928 through valve 958. Alternatively, DI water can be continuously added to column 964, and allowed to overflow in order to minimize bacteria growth.

Chemical mixing systems 400, 800, 900 and the associated control system 436 offer considerable advantages. In particular, the systems 400, 800, 900 and system 436 are capable of quickly blending slurry components to the desired solids content. The control system 436 can be programmed to blend these components to any of a wide range of conductivity values. Furthermore, batches of chemical slurries can be blended to a very high degree of accuracy.

EXAMPLE 1

Preparation of an Oxide Slurry

A CMP slurry, CAB-O-SPERSE SC-1, will be prepared using the chemical mixing system 400 displayed in FIG. 4. Specifically, a 55 gallon supply drum of CAB-O-SPERSE SC-1 (concentrated slurry source 424) will be attached to the system 400. A pressurized supply of ultrapure de-ionized water will be used as the diluent source 418. The desired mix ratio will be 1 volumetric part CAB-O-SPERSE SC-1 concentrate (30% by weight silica particles in less than 1% KOH) to 1.8 volumetric parts water. This mix ratio will yield a blended slurry comprising approximately 12% by weight silica particles with a conductivity of approximately 0.825 mS/cm (the Derived Qualification Setpoint). The setpoints that will be used in blending CAB-O-SPERSE SC-1 slurry are shown in the following table:

| Setpoint | Percent of Setpoint* | Weight Percent Silica | Conductivity (mS/cm) |
|---|---|---|---|
| Coarse Blend Setpoint | 90 | 10.80 | 0.766 |
| Fine Blend Setpoint | 95 | 11.40 | 0.796 |
| Lower Qualification Range Setpoint | 99 | 11.88 | 0.820 |
| Desired Qualification Setpoint | 100 | 12.00 | 0.825 |
| Upper Qualification Range Setpoint | 101 | 12.12 | 0.831 |

*in terms of percent silica

The pump 432 will be activated and valve 416 will open to draw concentrated CAB-O-SPERSE SC-1 from the concentrated slurry source 424 into the mix vessel 402. Mix vessel 402 will be sized to a working volume of 100 liters. Valve 416 will continue to be open until the liquid in the mix vessel 402 rises to liquid level sensor 434 at which time valve 416 will close. Approximately 30 liters of CAB-O-SPERSE SC-1 will have entered the recirculation line 428 and mix vessel 402. Valve 412 will then open allowing ultrapure de-ionized water to fill the mix vessel 402. Valve 412 will close once the level of the fluid in the mix vessel reaches a level detectable by the liquid level sensor 422. Approximately 64 liters of water will have entered the mix vessel 402. Pump 432 will continue to circulate the blended slurry during these addition times to promote mixing.

After four minutes of recirculation, the conductivity of the blended slurry will be measured by conductivity assembly 414. Valve 416 will open and remain open as long as the measured conductivity is less than Coarse Blend Setpoint (10.80 wt % silica, 0.766 mS/cm) which is 90% of the desired qualification set point (12 wt % silica, 0.825 mS/cm). Conductivity increases with increased addition of CAB-0-SPERSE SC-1.

After the conductivity value exceeds the Coarse Blend Setpoint (10.80 wt % silica, 0.766 mS/cm), valve 416 will close. After four minutes of recirculation, the conductivity of the blended slurry will again be measured by conductivity assembly 414. Control system 436 will then calculate a concentrated slurry injection time effective to increase the conductivity of the blended slurry to a conductivity greater than the Fine Blend Setpoint. As pump 432 is running, valve 416 will open for the calculated injection time and allow CAB-0-SPERSE SC-1 concentrated slurry to enter mix vessel 402 and recirculation line 428. Valve 416 will close after the injection time elapses and pump 432 will again mix the contents of the mix vessel 402 and recirculation line 428 for four minutes.

The conductivity of the blended slurry will again be measured by conductivity assembly 414. Control system 436 will use the measured conductivity to calculate an injection time effective to adjust the conductivity of the blended slurry to the Desired Qualification Setpoint. As pump 432 is running, valve 416 will open for the calculated injection time and allow CAB-O-SPERSE SC-1 concentrated slurry to enter mix vessel 402 and recirculating line 428. Valve 416 will close after the injection time elapses and pump 432 will again mix the contents of mix vessel 402 and recirculation line 428 for four minutes.

The conductivity of the blended slurry will again be measured and the measured conductivity used to determine if another injection of concentrated slurry is needed. If the measured conductivity is between the Lower Qualification Range Setpoint (11.88 wt % solids, 0.820 mS/cm) and the Upper Qualification Range Setpoint (12.12 wt % solids, 0.831 mS/cm), no further additions of concentrated slurry would be needed and pump 432 would continue to mix and the contents of mix vessel 402 and recirculation line 428. The conductivity again would be measured by conductivity assembly 414 to ensure a correct percent solids content. After this measurement, valve 444 would be opened and the contents of the mix vessel 402 would be transferred to a point of use (not shown). Valve 444 would shut once the level in the tank reaches liquid level sensor 458.

EXAMPLE 2

Preparation of a Tungsten Slurry

A CMP slurry, SEMI-SPERSE W-A400/FE-400, will be prepared using the chemical mixing system 800 displayed in FIG. 8. Specifically, a 55 gallon supply drum of SEMI-SPERSE W-A400 (concentrated slurry component A source 824) will be attached to system 800. Additionally, a 55 gallon supply drum of SEMI-SPERSE FE-400 (concentrated slurry component B source 846) will also be attached to system 800. Concentrated slurry component C source 852 will not be utilized to prepare this slurry. The desired mix ratio will be 1 volumetric part SEMI-SPERSE W-A400 (6% by weight alumina particles) to 1 volumetric part SEMI-SPERSE FE-400 (0% by weight alumina particles). This mix ratio will yield a blended slurry comprising approximately 3% by weight alumina particles with a conductivity of approximately 30.70 mS/cm. The setpoints used in blending SEMI-SPERSE W-A400/FE-400 slurry are shown in the following table:

| Setpoint | Percent of Setpoint* | Weight Percent alumina | Conductivity (mS/cm) |
|---|---|---|---|
| Coarse Blend Setpoint | 110 | 3.30 | 28.25 |
| Fine Blend Setpoint | 105 | 3.15 | 29.47 |
| Upper Qualification Range Setpoint | 101 | 3.03 | 30.46 |
| Desired Qualification Setpoint | 100 | 3.00 | 30.70 |
| Lower Qualification Range Setpoint | 99 | 2.97 | 30.95 |

*in terms of percent alumina

Pump 832 will be activated and valve 816 will open to draw concentrated SEMI-SPERSE W-A400 from concentrated slurry component A source 824 into mix vessel 802. Mix vessel 802 will be sized to a working volume of 100 liters. Valve 816 will continue to be open until the liquid in the mix vessel 802 rises to liquid level sensor 834 at which time valve 816 will close. Approximately 50 liters of SEMI-SPERSE W-A400 will have entered the recirculation line 828 and mix vessel 802. Valve 850 will then open allowing SEMI-SPERSE FE-400 to enter recirculation line 828. Valve 850 will close once the level of the fluid in the mix vessel 802 reaches level indicator 822. Approximately 40 liters of SEMI-SPERSE FE-400 will have entered the mix vessel 802. The pump 832 will continue to circulate the blended slurry during these addition times to promote mixing.

After four minutes of recirculation, the conductivity of the blended slurry will be measured by conductivity assembly 814. Valve 850 will open and remain open as long as the measured conductivity is less than the Coarse Blend Setpoint (3.30 wt % alumina, 28.25 mS/cm) which is 110% of the Desired Qualification Setpoint (3.0 wt % aluminum, 30.70 mS/cm). Conductivity increases with increased addition of SEMI-SPERSE FE-400.

After the measured conductivity value exceeds the Coarse Blend Setpoint (3.30 wt % alumina, 28.25 mS/cm) valve 850 will close. After four minutes of recirculation, the conductivity of the blended slurry will again be measured by conductivity assembly 814. Control system 836 will then calculate a concentrated slurry injection time effective to increase the measured conductivity of the blended slurry to a conductivity greater than the Fine Blend Setpoint. As pump 832 is running, valve 850 will open for the corresponding injection time and allow SEMI-SPERSE FE-400 slurry concentrate to enter mix vessel 802 and recirculation line 828. Valve 850 will close after the injection time elapses and pump 832 will again mix the contents of mix vessel 802 and recirculation line 828 for four minutes.

The conductivity of the blended slurry will again be measured by conductivity assembly 814. If the measured conductivity is greater than the Fine Blend Setpoint, control system 836 will use the measured conductivity to calculate an injection time effective to adjust the conductivity of the blended slurry to the Desired Qualification Setpoint. As pump 832 is running, valve 850 will open for the calculated injection time and allow SEMI-SPERSE FE-400 slurry concentrate to enter mix vessel 802 and recirculation line 828. Valve 850 will close after the injection time elapses and pump 832 will again mix the contents of mix vessel 802 and recirculation line 828 for four minutes.

The conductivity of the blended slurry will again be measured by conductivity assembly 814 and the measured conductivity used to determine if another injection of concentrated slurry is needed. If the conductivity is between the Lower Qualification Range Setpoint (2.97 wt % alumina, 30.95 mS/cm) and the Upper Qualification Range Setpoint (3.03 wt % alumina, 30.46 mS/cm), no further additions would be needed and pump 832 would continue to mix the contents of mix vessel 802 and recirculation line 828. The conductivity would then again be measured to ensure a correct percent solids content. After this measurement, valve 844 would be opened and the contents of the mix vessel 802 would be transferred to a point of use (not shown). Valve 844 would shut once the level in the tank reaches liquid level sensor 858.

Other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following claims.

What is claimed is:

1. A chemical mixing system and slurry having a desired insoluble solids content resulting from mixing at least first and second chemical components, the system and slurry comprising:

(a) a mix vessel containing a mix volume suitable for preparing the slurry from at least first and second chemical components, wherein at least one of the chemical components comprises insoluble solid particles, and wherein the mix volume is adapted to receive the chemical components from at least first and second component sources, respectively;

(b) a control system responsive to a measured conductivity value comprising a first conductivity sensor at a position effective to detect when a defined amount of one of the chemical components is added to the mix volume and a conductivity probe at a position effective to detect when a combined amount of the chemical components has the desired insoluble solids content at a measured conductivity value, wherein the control system generates a control signal to control the addition of at least one of the chemical components to the mix volume when a slurry is prepared so that the addition of the at least one chemical component is ceased when the slurry has a measured conductivity value equal to a reference conductivity and corresponding to a desired insoluble solids content;

(c) at least one valve disposed in the chemical mixing system at a position effective to regulate the amount of the at least one chemical component added to the mix volume, wherein the at least one control valve is actuated by the control signal generated by the control system and operative to vary the rate of addition of the at least one chemical component in response to the measured conductivity value of the slurry;

(d) a recirculation loop; and (e) a slurry having the desired insoluble solids content.

2. The chemical mixing system and slurry of claim 1, wherein at least a position of an internal surface of the mix volume vessel comprises a corrosion resistant material selected from the group consisting of an ultra high molecular weight polyethylene, a fluorinated polymer, and polypropylene.

3. The chemical mixing system and slurry of claim 2, wherein the corrosion resistant material is a fluorinated polymer selected from the group consisting of a perfluoroalkoxy polymer, polytetrafluoroethylene, fluorinated ethylene propylene, polyvinylidene fluoride, ethylene tetrafluoroethylene, and chlorotrifluoroethylene.

4. The chemical mixing system and slurry of claim 1, wherein the first conductivity sensor is located at the mix vessel.

5. The chemical mixing system and slurry of claim 1, wherein the first conductivity sensor is located in the recirculation loop.

6. The chemical mixing system and slurry of claim 1, wherein the conductivity probe is located at the mix vessel.

7. The chemical mixing system and slurry of claim 1, wherein the conductivity probe is located in the recirculation loop.

8. The chemical mixing system and slurry of claim 1, further comprising a pump operationally coupled to the chemical mixing system to motivate the chemical components through the system.

9. The chemical mixing system and slurry of claim 1, further comprising a discharge line for transmitting the slurry from the mix vessel to a point of use.

* * * * *